Patented Sept. 18, 1951

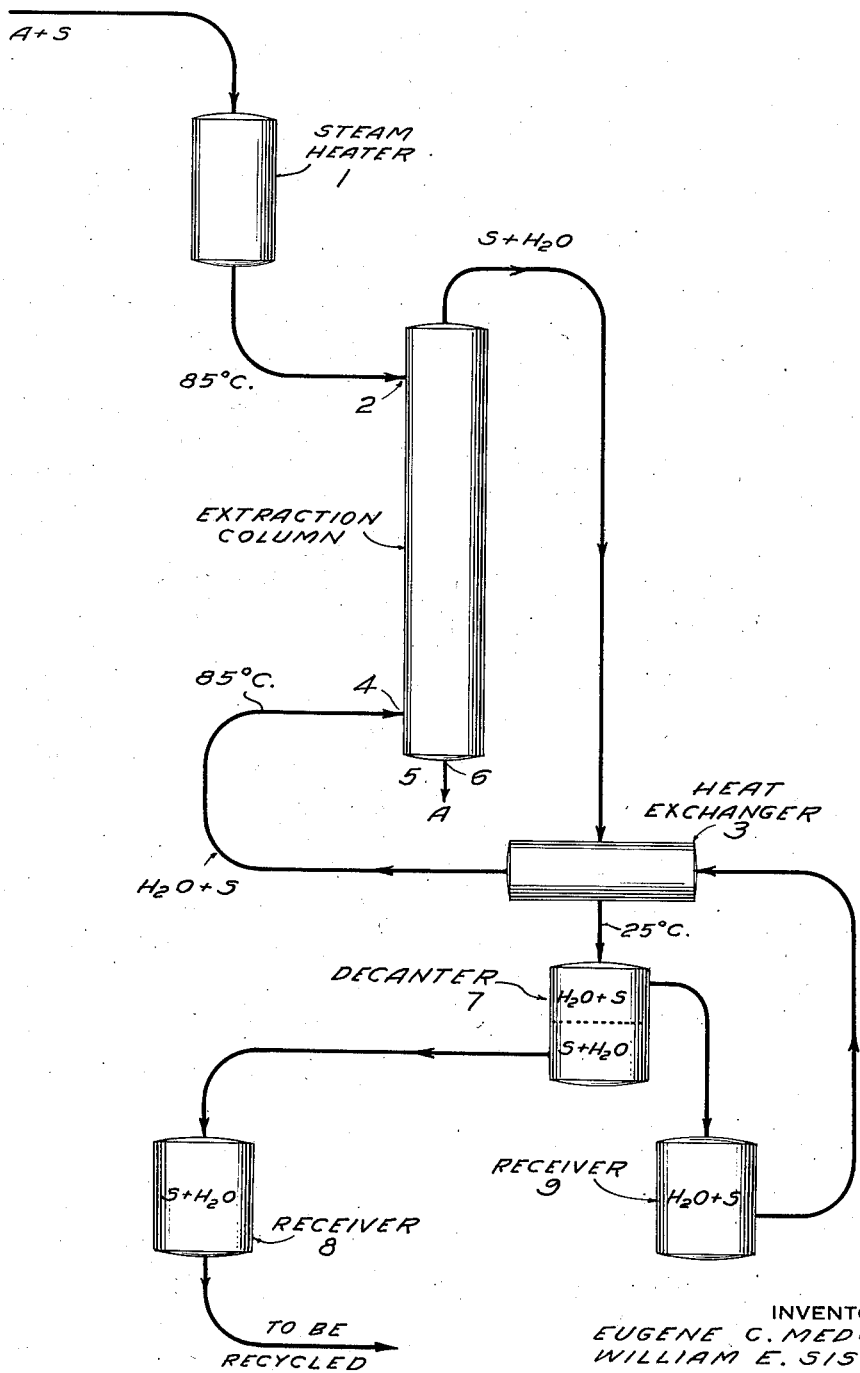

2,568,159

UNITED STATES PATENT OFFICE 2,568,159

RECOVERY OF DICYANODIALKYL ETHERS AND SULFIDES USED AS SOLVENTS IN AN AROMATIC HYDROCARBON EXTRACTION PROCESS

Eugene C. Medcalf, Bound Brook, and William E. Sisco, Somerville, N. J., assignors to American Cyanamid Company, New York, N. Y., a corporation of Maine Application February 10, 1950, Serial No. 143,585

10 Claims. (Cl. 260—674)

This invention relates to an improved method of recovering solvents of the bis-cyanoalkyl ether and sulfide type.

Bis-cyanoalkyl ethers and sulfides, particularly the beta-cyano-ethyl ether and sulfide, have shown extraordinarily good solvent characteristics for the separation of unsaturated hydrocarbons from saturated hydrocarbons; e. g. aromatics from paraffins and the like, and permit a very effective process of solvent refining of hydrocarbon fractions, particularly those obtained in the petroleum industry. The ethers and sulfides show a very high solubility for aromatic hydrocarbons, such as benzene, toluene, naphthalene and the like, and extremely low solubility for paraffins. It is thus possible to use the solvents very effectively in separating aromatic compounds from paraffins.

Solvent processes using cyanoalkyl ethers and sulfides present a serious problem of solvent recovery. In the past the solvents have been recovered by various distillation processes. However, the high boiling points of the cyanoalkyl ethers and sulfides result in serious decomposition which may amount to as high as 10 to 30% per hour at temperatures of 200° C. and higher. For many processes this loss results in a prohibitive cost and has seriously restricted the field of utility of these otherwise extraordinarily effective solvents.

The present invention depends on the discovery that it is possible to recover almost quantitatively the solvents by use of water. The solubility curve of the solvents in water is extraordinarily steep. At temperatures of about 75 to 100° C. bis(2-cyanoethyl)ether and water are miscible in all proportions and the solubility of the sulfides is sufficiently high for practical use. At room temperature, however, the solubility drops to not more than a very few per cent even for the most soluble liquids. In fact, the solubility is so low that the amount of water dissolved in the solvent at room temperature is small enough that it does not interfere with the action of the solvent on reuse.

The recovery of the solvent is very high, and there is practically no loss by decomposition as the temperature need never exceed 100° C., and even in the presence of water the solvents are substantially stable. The cost of the process is very low because the water can be reused and therefore introduces no loss in dissolved solvent, and the heat requirements of the process are low.

It is a further advantage that the water-solvent solution contains only a fraction of a percent of the dissolved aromatics, and even this small percentage is not lost because it is carried around through the process when the solvent is reused.

The present invention is not limited to any particular steps which result in a solution of unsaturated and, particularly, aromatic compounds in the solvent. The most important field, however, is in connection with the solvent separation of petroleum fractions, and the cheap solvent recovery system which is made possible by the present invention for the first time opens up a large field to solvent recovery processes using the cyanoalkyl ethers and sulfides as solvents.

The solvents are also useful for the separation of compounds other than hydrocarbons where there is a sufficient difference in solubility. For example, they may be used in the separation of monoalkyl phenols from polyalkyl phenols, N-monoalkyl aromatic amines from N-polyalkyl aromatic amines, N-alkyl aromatic amines from isomeric C-alkyl aromatic amines, and the like. The present process of solvent recovery is not particularly concerned with the material which is dissolved in the solvent so long as it is not water-soluble. The invention will be described more particularly in connection with solutions of aromatic hydrocarbons in the solvents, it being understood that the mechanism of the separating process is no different with solutions of aromatic hydrocarbons than with solutions of the other materials referred to above.

While the present invention is particularly suitable for the recovery of bis(2-cyanoethyl)-ether and sulfide, it is not limited thereto, and is equally effective with other cyanoalkyl ethers and sulfides, such as the beta and gamma-propyl compounds, butyl, etc. As the hydrocarbon chain lengthens, a point is finally reached where the solubility characteristics in water are no longer satisfactory for separation, and where the compounds are not liquid at room temperature. The invention is therefore limited to the recovery of the lower cyanoalkyl ethers and sulfides.

The invention will be described in greater detail in conjunction with the following specific examples and with the drawing, which is a diagrammatic flowsheet of a typical embodiment of the invention.

In order to make the drawing more clear, the cyanoalkyl ether and sulfide solvents will be designated by the letter S, and water-insoluble, unsaturated material, such as aromatic hydrocarbons, by the letter A. The general flowsheet will be described first, followed by specific examples giving proportions.

In the drawing, the solution of the aromatics in the solvent is heated to 85° C. in the steam-heated heater 1. The hot liquid is then introduced into an extraction column near the top at point 2. The whole of the column is maintained at about 85° C. Water containing a very small amount of solvent is introduced into the bottom of the extraction column at the point 4, and flows up, becoming gradually saturated with solvent, leaving at point 6, while a very concentrated solution of the aromatics-in-solvent, or solvent-in-aromatics, flows out through the bottom of the column at 5. The solution of solvent in water next passes through the heat-exchanger 3, where it is cooled by heat exchange with water containing a small amount of solvent, the latter being heated up and reintroduced into the extraction column at point 4, as described above. In the heat-exchanger the solution of solvent in water is cooled to slightly above room temperature, about 25° C., and flows into a decanting vessel 7, where two layers form, the upper layer being water containing a small percentage of solvent, and the bottom layer solvent containing a small percentage of water. The two layers are continuously decanted, the water layer passing to a receiver 9 from whence it is recirculated through the heat-exchanger 3. The solvent layer goes to a receiver 8 from which it can be reused in the original process producing the solution of aromatics.

*Example 1*

The process shown on the flowsheet is carried out using a solution of 1 part of naphthalene in 10 parts of bis(2-cyanoethyl)ether. Hot water, containing a small amount of solvent, is introduced into the bottom of the extraction column at a rate about three times that of the solvent introduction at the top of the column. A raffinate, consisting largely of naphthalene having dissolved in it a little solvent, leaves the bottom of the column. The small amount of solvent can be removed therefrom by washing with hot water or other simple means. The water-solvent layer leaving the top of the column contains only about 0.3% naphthalene. When this solution is cooled, it separates into two layers, the water layer containing very little solvent, about 10%, and the solvent layer carrying the naphthalene likewise contains a small amount, about 10%, of water. The water is recycled through the extraction column with any make-up water added, and the solvent can be reused in the separation of naphthalene in petroleum fractions. The very small amount of water dissolved in the solvent does not materially change its solvent characteristics and makes it unnecessary to remove the water, although, if desired, this can be done by a fairly low temperature distillation.

*Example 2*

The procedure of Example 1 is followed in general, but the solvent is bis(2-cyanoethyl)sulfide instead of the ether of Example 1. The solubility characteristics of the sulfide are such that the water ratio should be higher, about 12 to 1 instead of 3 to 1 as in Example 1. Also, the temperature in the column may advantageously be slightly higher, about 90° C. The distribution of naphthalene in various layers is practically the same as in Example 1. The decanted water contains about 1% of the solvent, and the solvent about 1% of water.

*Example 3*

The procedure of Example 1 is followed, but the solvent contains toluene instead of naphthalene. The column is operated at a slightly lower temperature, about 80° C. The separation is substantially the same as in Example 1, except that the circulation in the column is reversed; toluene coming off the top and the water-solvent mixture coming off the bottom.

*Example 4*

3 parts of water and 1 part of a solution of 10% naphthalene in bis(2-cyanoethyl)ether is thoroughly mixed and heated to 85° C., is then allowed to settle hot, a smaller, lower layer separating out. This is decanted and, on cooling, solidifies. It contains about 40% naphthalene. The water-solvent layer contains about 0.3% naphthalene and, on cooling, separates into two layers in the same manner as the water-solvent mixture in Example 1.

*Example 5*

A mixture of 3 parts of water and 1 part of bis(2-cyanoethyl)sulfide containing 10% of toluene is heated to 80° C. and mixed, and is then allowed to settle. A small upper layer comes off, containing solvent with about 30% of toluene. The lower, water layer contains about 0.3% toluene and, on cooling, separates as described in Example 3.

*Example 6*

The procedure of Example 1 is followed, but the solution is one of naphthalene in alpha, beta' - dicyano - diethylether. This ether has somewhat less water solubility than the solvent of Example 1, and the proportion of water should therefore be 10 to 1 instead of 3 to 1. The temperature in the hot column is 85° C. The raffinate which is removed from the bottom of the column contains 30 to 35% of naphthalene.

*Example 7*

The procedure of Example 1 is applied to a 12% solution of naphthalene in bis(beta-cyanoisopropyl)ether. The extraction is effected at 85 to 90° C. with water saturated with solvent. The raffinate contains about 30 to 35% naphthalene and the water and solvent layers, which separate on cooling, contain from 4 to 6% of water and solvent respectively, instead of about 10% as in the case of Example 1.

In some of the examples a proportion of 3 parts of water to 1 part of solvent has been used. The proportion is in no sense critical, but represents a good economical lower limit with the more soluble solvents such as the ether of Example 1. More water may, of course, be employed, and is needed where the solubility is lower, i. e. some of the sulfides. Unnecessary water, however, only increases the circulating load on the equipment. A somewhat smaller amount of water can also be used, but if the amount is cut too small the efficiency of separation sometimes suffers, resulting in more solvent in the aromatics separated, and it is therefore desirable to operate with a slight excess of water.

The examples describe processes which are effected substantially at atmospheric pressure. For most operations this is preferable because it effects a substantial saving of equipment. On the other hand, it is possible to operate the extraction column in the case of continuous processes, or the mixing vessel in the case of batch processes, under moderate pressure. This can result in somewhat higher temperature of the water and has the advantage in some cases of preventing vapor lock or losses where the dissolved material has a considerable vapor pressure at the temperature used in the extraction. Even with pressure it is normally not necessary to go to temperatures higher than 70 to 100° C. and, in fact, it is usually desirable to maintain as low a temperature as is consistant with good solvent recovery.

We claim:

1. A process of separating dissolved material of low water solubility from solutions in a dinitrile solvent having the formula

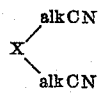

in which X is an element of the sixth group of the periodic system, having an atomic number not exceeding 16, and alk is a lower alkylene radical, which comprises mixing the solution with water at a temperature of about 70 to 100° C., the amount of water being sufficient to dissolve the dinitrile solvent at said temperature and to convert the said solution into a water-insoluble layer and a unitary water-solvent layer, separating the water-insoluble layer from the unitary water-solvent layer, cooling the unitary water solvent layer to convert the same into a water layer and a dinitrile solvent layer and separating the water layer from the dinitrile solvent layer.

2. A process according to claim 1 in which the hot water is contacted with the solvent in the form of a counter-current stream and the separation of the water-insoluble layer from the unitary water-solvent layer is effected continuously.

3. A process according to claim 2 in which the dissolved material belongs to the class of aromatic hydrocarbons.

4. A process according to claim 3 in which X is oxygen.

5. A process according to claim 4 in which the solvent is bis(2-cyanoethyl) ether.

6. A process according to claim 5 in which the hydrocarbon is naphthalene.

7. A process according to claim 1 in which X is oxygen.

8. A process according to claim 7 in which the solvent is bis(2-cyanoethyl) ether.

9. A process according to claim 1 in which X is sulfur.

10. A process according to claim 9 in which the solvent is bis(2-cyanoethyl) sulfide.

EUGENE C. MEDCALF.
WILLIAM E. SISCO.

REFERENCES CITED

The following references are of record in the file of this patent:

UNITED STATES PATENTS

| Number | Name | Date |
|---|---|---|
| 2,433,751 | Friedman | Dec. 30, 1947 |
| 2,439,534 | Wilkes | Apr. 13, 1948 |
| 2,441,827 | McKinnis | May 18, 1948 |